Feb. 16, 1954 A. RAMSAY 2,669,257
QUICK CLOSING VALVE WITH FLUID PRESSURE RELEASE MECHANISM
Filed July 28, 1951 2 Sheets-Sheet 1

UNITED STATES PATENT OFFICE 2,669,257

QUICK CLOSING VALVE WITH FLUID PRESSURE RELEASE MECHANISM

Alexander Ramsay, Glasgow, Scotland, assignor to James Howden & Company Limited, Glasgow, Scotland, a corporation of Great Britain and Northern Ireland Application July 28, 1951, Serial No. 239,034

1 Claim. (Cl. 137—699)

This invention relates to quick closing valves of the type in which a screw-threaded spindle is in engagement with a nut forming element entrained by the movable member of the valve, and is slidable axially as well as being rotatable, a spring being provided to urge the spindle to slide towards valve-closed position, and in which one end of a toggle is pivoted to a collar entrained by the spindle, the other end of the toggle being pivoted to a fixed pivot, and one end of a trip member is pivoted to the centre of the toggle, the other end being engageable with a fixed seat.

In a valve of the type referred to according to the invention a lever is pivoted at one end to a fixed support and is connected at the other end to operating means, said lever carrying two abutments, one engageable with the trip member, and the other engageable with one of the links of the toggle.

Figure 1:
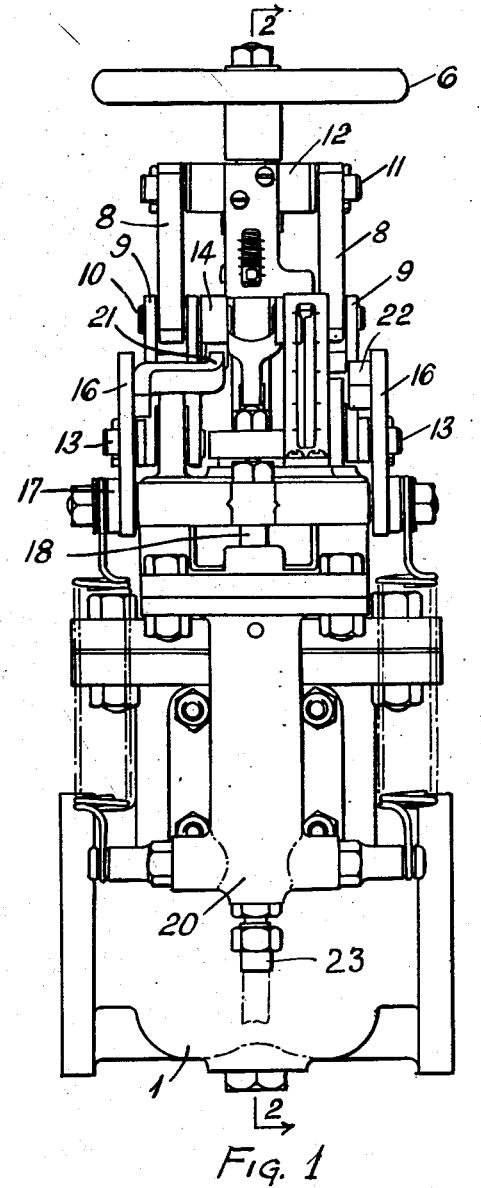
Figure 2:
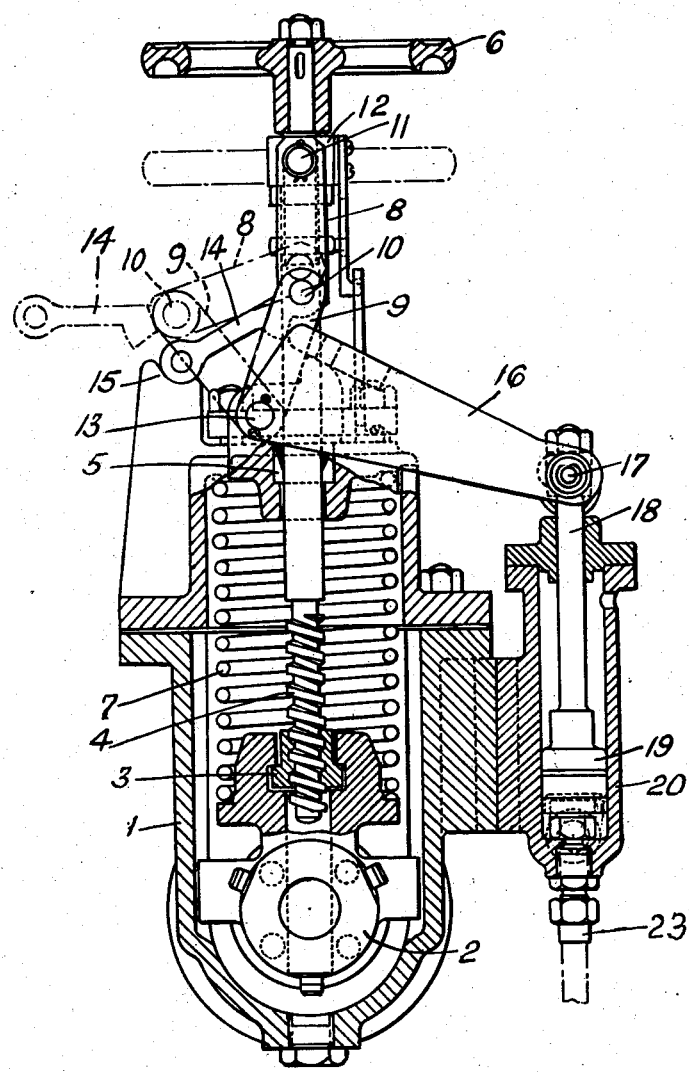

A practical embodiment of the invention is illustrated in the accompanying drawings in which Fig. 1 is a side elevation of a valve and Fig. 2 is a cross section on the line 2—2 in Fig. 1.

In the drawings, I denotes a valve body containing a movable member 2 entraining a nut-forming element 3 engaging a screw-threaded spindle 4 slidable axially through a gland 5, said spindle 4 carrying a handle 6 and being urged by a spring 7 to slide into the valve body 1. 8 and 9 denote links of a toggle connected to one another at 10, the links 8 being pivoted at 11 to a collar 12 entrained by the spindle 4, and the links 9 being pivoted at 13 to the valve body 1. 14 denotes a trip member pivoted at one end to the centre pivot 10 of the toggle, the other end being engageable with a fixed seat 15. 16 denotes a lever adapted to swing around the pivot 13 and pivoted at 17 to a piston rod 18 connected to a piston 19 slidable in a cylinder 20, said cylinder 20 being adapted to receive operating fluid at the bottom through a connection 23. The lever 16 at one side carries an abutment 21 engageable with the trip member 14, and on the other side carries a second abutment 22 engageable with one of the links 9 of the toggle.

In practice, when the valve is being used normally, the spindle 4 is slid away from the valve body 1, the toggle links 8 and 9 being disposed almost in alignment, the trip member 14 being engaged with the fixed seat 15 and the piston 19 being in the inoperative position. When the valve is thus arranged, the movable member 2, i. e., the sluice in the valve illustrated, may be moved between the valve-closed and the valve-open positions by rotating the spindle 4. When the valve is open and is to be closed rapidly, the piston 19 is actuated, swinging the lever 16 about its pivot 13 and causing the abutment 21 to come into contact with the trip member 14 and disengage the trip member 14 from its seat 15. The toggle thereupon is broken, assisted by the abutment 22, and the spring 7 slides the spindle 4 into the valve body 1 to close the valve.

What is claimed is:

In a quick closing valve, in combination, a valve housing presenting a valve opening, a movable valve closure member to close said opening, an axially movable and rotatable screw-threaded spindle entering said housing, a nut-forming element within said housing, said nut-forming element engaging said spindle and being entrained by said movable member, a spring urging said spindle to slide within said housing towards valve-closed position, a toggle comprising jointed links disposed externally of said housing, one link of said toggle being pivoted to said housing, a collar entrained by said spindle and pivoted to the other link of said toggle, a trip member pivoted at one end to the joint of said toggle links, a fixed seat presented by said housing and engageable by the other end of said trip member, a double lever presenting two abutments, one end of said lever being pivoted to the pivot of the first-mentioned toggle link and a fluid pressure release mechanism coupled to the other end of said lever, one of said abutments being engageable with said trip member, and the other abutment being engageable with one of the links of said toggle.

ALEXANDER RAMSAY.

References Cited in the file of this patent

UNITED STATES PATENTS

| Number | Name | Date |
|---|---|---|
| 930,847 | Dolley | Aug. 10, 1909 |
| 960,872 | Fischer | June 7, 1910 |
| 1,324,409 | Richardson | Dec. 9, 1919 |
| 1,594,177 | Knauf | July 27, 1926 |
| 2,504,638 | Browning | Apr. 18, 1950 |